(12) United States Patent
Wu (10) Patent No.: US 8,057,344 B2
(45) Date of Patent: *Nov. 15, 2011

(54) ENDLESS BELT WITH IMPROVED LOAD CARRYING CORD

(75) Inventor: Shawn Xiang Wu, Rochester Hills, MI (US)

(73) Assignee: The Gates Corporation, Denver, CO (US)

( * ) Notice: Subject to any disclaimer, the term of this patent is extended or adjusted under 35 U.S.C. 154(b) by 143 days.

This patent is subject to a terminal disclaimer.

(21) Appl. No.: 11/825,010

(22) Filed: Jul. 3, 2007

(65) Prior Publication Data

US 2007/0259746 A1    Nov. 8, 2007

Related U.S. Application Data

(63) Continuation-in-part of application No. 11/088,602, filed on Mar. 24, 2005, now Pat. No. 7,254,934.

(51) Int. Cl.
  *F16G 1/00* (2006.01)
(52) U.S. Cl. .......................... 474/260; 474/205; 474/238
(58) Field of Classification Search .................. 474/202, 474/204–205, 238, 260
  See application file for complete search history.

(56) References Cited

U.S. PATENT DOCUMENTS

| | | | |
|---|---|---|---|
| 3,911,755 A | 10/1975 | Vance | |
| 4,652,252 A | 3/1987 | Westhoff et al. | |
| 4,787,200 A | 11/1988 | Inada et al. | |
| 4,790,802 A | 12/1988 | Onoe et al. | 474/260 |
| 4,832,102 A | 5/1989 | Domchick | |
| 4,838,843 A | 6/1989 | Westhoff | 474/205 |
| 5,130,408 A | 7/1992 | Deeg | 528/125 |
| 5,230,667 A | 7/1993 | Nakajima et al. | 474/263 |
| 5,807,194 A | 9/1998 | Knutson | 474/268 |
| 6,763,867 B2 | 7/2004 | Kanehira | 152/527 |
| 6,818,728 B2 | 11/2004 | Kato et al. | 528/220 |
| 6,851,463 B1 | 2/2005 | Socci et al. | |
| 2002/0039947 A1* | 4/2002 | Hasaka et al. | 474/263 |
| 2005/0119082 A1* | 6/2005 | Lofgren et al. | 474/260 |
| 2006/0094861 A1* | 5/2006 | Kato et al. | 528/425 |
| 2007/0249452 A1* | 10/2007 | South | 474/263 |

FOREIGN PATENT DOCUMENTS

| | | | |
|---|---|---|---|
| JP | 5-83776 | * | 11/1993 |
| JP | 05-83776 A | | 11/1993 |

OTHER PUBLICATIONS

Ernest R. Kaswell, "Wellington Sears Handbook of Industrial Textiles," Wellington Sears Co. (West Point, GA 1963) pp. 440-443.

* cited by examiner

*Primary Examiner* — Bradley T King
*Assistant Examiner* — Anna Momper
(74) *Attorney, Agent, or Firm* — P. N. Dunlap, Esq.; J. A. Thurnau, Esq.; T. A. Dougherty (57) ABSTRACT

A power transmission belt with an embedded load carrier cord having a plurality of yarns and possessing a first twist corresponding to a first twist multiplier and a first twist direction, and possessing a second twist corresponding to a second twist multiplier in the opposite direction, such that the ratio of the first twist multiplier to the second twist multiplier is greater than about 1.5, and at least one yarn includes fibers of polyketone or polyvinylalcohol.

27 Claims, 4 Drawing Sheets

ENDLESS BELT WITH IMPROVED LOAD CARRYING CORD

This application is a continuation in part of U.S. patent application Ser. No. 11/088,602 filed Mar. 24, 2005 now U.S. Pat. No. 7,254,934.

BACKGROUND OF THE INVENTION

The present invention pertains to endless belts comprising a load carrier cord, and particularly to such belts wherein the cord comprises a plurality of plied yarns that are twisted together to form the cord in a direction opposite that of the first twist of the plied yarns with the ratio of the first twist multiplier to the second twist multiplier greater than about 1.5 and at least one yarn comprising fibers of polyketone or polyvinylalcohol.

In the construction of endless belts, flexible couplings, tires, and other rubber composite articles employing a load-carrying cord comprising a plurality of yarns, it is known to first twist together one or more ends of yarns in a first step to form a number of plied yarns, and to then twist together the plied yarns in a second step to form a plied or cabled cord. In such constructions it is known to twist the individual yarns in one direction in the first twist stage and to ply the twisted yarns in the opposite direction in the second twist stage. Conventionally in such constructions for such purposes, it has been found desirable to perform the twisting and plying operations to achieve a balanced twist; i.e., that arrangement which will not cause the cord to twist on itself when held in an open loop. This is accomplished for example by performing the first and the second twist operations such that the filament direction in the plied cord is the same as the longitudinal axis of the cord itself, and is described by employing equal but opposite twist multipliers in the first and the second twists.

Particularly but not exclusively in the area of multi-v-ribbed belts for utilization in modern multi-function automotive applications such as generator-starter devices, the performance requirements for both the belts' flexural fatigue resistance and its load carrying capability have increased dramatically. Higher modulus cords, including those formed of polyethylene naphthalate (PEN), poly(p-phenylene-2,6-benzobisoxazole) (PBO), aramid, or liquid crystal polymer (LCP) or polyvinylalcohol (PVA) or polyketones (PK) are known to exhibit high load carrying capability, but are known to exhibit relatively poor flexural fatigue resistance. Attempts have been made to improve the flexural fatigue resistance of belts formed from such cords, e.g., by utilizing braided cord instead of plied cord, but such methods are generally more expensive, and tend to decrease the overall cord strength, thereby diminishing the materials' value.

The need remains for a high modulus load carrying cord, including for incorporation in an endless belt or similar rubber composite article, which exhibits a good balance of load carrying capability and flexural fatigue resistance.

SUMMARY OF THE INVENTION

The present invention provides a load carrying cord for incorporation in a rubber composite article such as an endless belt, a flexible shaft coupling, an airspring or a tire, comprising a plied cord formed from a plurality of twisted yarns, wherein the twisted yarns possess a configuration corresponding to a first twist multiplier, and the plied cord possesses a configuration corresponding to a second twist multiplier, and characterized in that the second twist is in the opposite direction from the first twist, and the ratio of the first twist multiplier to the second twist multiplier is at least 1.5.

In a further embodiment the present invention provides an endless power transmission belt, selected from a multi-v-ribbed belt, a v-belt, a flat belt, and a toothed belt, incorporating the load carrying cord.

In yet another embodiment a multi-v-ribbed belt is provided incorporating such cord, which is one formed from fibers, wherein at least half of the fibers comprise an organic fiber selected from PEN, PBO, aramid, LCP, PK, PVA, and a combination of any two or more thereof.

Also provided is a method of making a belt having a load carrying cord, comprising the steps of optionally adhesively treating one or more base yarns; twisting one or more base yarns together in a first twist direction with a first twist multiplier to form strands; and twisting one or more of the strands together in a second twist direction opposite the first direction with a second twist multiplier to form the cord; wherein the first twist multiplier is greater than the second twist multiplier as indicated by a ratio of at least 1.5:1.

BRIEF DESCRIPTION OF THE DRAWINGS

The accompanying drawings, which are incorporated in and form a part of the specification, illustrate preferred embodiments of the invention, and together with the description, serve to explain the principles of the invention. In the drawings, like numerals denote like parts and.

DETAILED DESCRIPTION

While the embodiments of articles comprising the load carrier cord of the present invention shown in the drawings are belts and belt drives, it is anticipated that the load carrier cords of the present invention will be useful in tires, air springs, flexible couplings, and other composite rubber articles subject to dynamic loads. Usage of load carrier cord in air springs is described for example in U.S. Pat. No. 4,954,194, and the contents of that publication with respect to same are incorporated herein by reference. Usage of load carrier cord as a tensile member in flexible couplings is described for example in U.S. Pat. No. 6,283,868, and the contents of that publication with respect to same are incorporated herein by reference. Usage of load carrier cord for carcass and/or tread reinforcement in tires is described for example in U.S. Pat.

No. 3,616,832, and the contents of that publication with respect to same are incorporated herein by reference.

Figure 1:
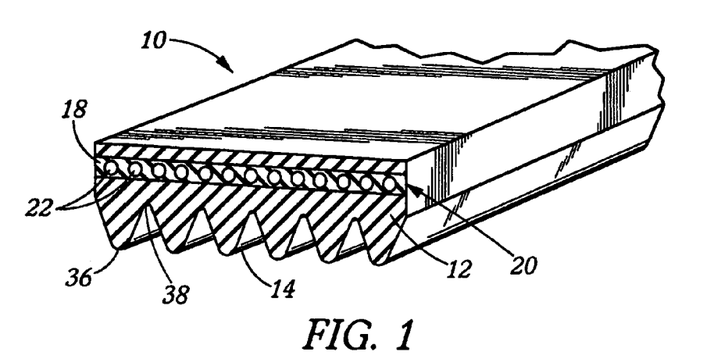
FIG. 1 is a perspective view, with parts in section, of a portion of a multi-V-ribbed belt constructed in accordance with an embodiment of the present invention.
Figure 2:
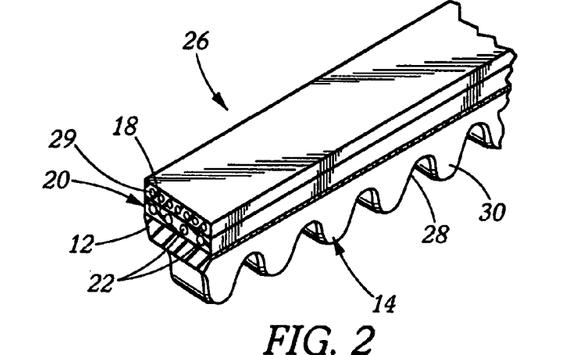
FIG. 2 is a perspective view, with parts in section, of a portion of a V-belt constructed in accordance with another embodiment of the present invention.
Figure 3:
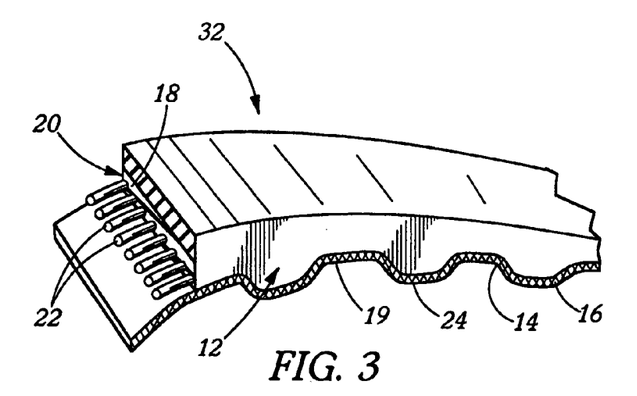
FIG. 3 is a perspective view, with parts in section, of a portion of a synchronous belt constructed in accordance with another embodiment of the present invention.

Referring to FIG. 1, a multi-V-ribbed belt 10 in accordance with an embodiment of the present invention is shown generally. The multi-V-ribbed belt 10 includes an elastomeric main belt body portion 12, or undercord, and a sheave contact portion 14 positioned along the inner periphery of the main belt body portion 12. The word, "sheave" as used in this context includes conventional pulleys and sprockets used with a power transmission belt, and also rollers and like mechanisms. The particular sheave contact portion 14 of the belt of FIG. 1 is in the form of a plurality of ribs comprising raised areas or apexes 36 alternating with a plurality of trough areas 38 defining therebetween oppositely facing sides. In each of the instances of FIGS. 1-2, the sheave contact portion 14 is integral with the main belt body portion 12 and may be formed from the same elastomeric material(s) as described below. In FIG. 3 however, the sheave contact portion 14 can be seen to comprise a reinforcing fabric 24, explained in further detail below, as conventionally utilized in synchronous belt building configurations, and is thus formed of a material other than that of the main belt body portion 12 in that embodiment of the present invention.

A tensile or load-carrying cord section 20 is positioned above the undercord 12 for providing support and strength to the belt 10. In the illustrated form the tensile section comprises at least one longitudinally extending tensile cord 22, described in further detail below, aligned along the length of the belt, and in accordance with various embodiments of the present invention, is at least partially in contact with or is embedded in an adhesive rubber member 18 described in further detail below. The skilled practitioner would readily appreciate that in the several FIGS. 1-3, the adhesive rubber member 18 is illustrated in exaggerated form in order to visually distinguish it from the other elastomeric portions of the belt. In actuality, the cured composite is frequently visually indistinguishable from the surrounding elastomeric belt body portion except in cases, e.g., where one and not the other of the adhesive rubber member 18 and the undercord 12 is fiber loaded. The adhesive rubber member 18 may actually be of the same material as the elastomeric main belt body 12.

A reinforcing fabric (not shown in FIG. 1) may optionally be utilized and in the case of V-belts and multi-V-ribbed belts intimately fits along the surface of the belt opposite the sheave contact portion 14 to form a face cover or overcord for the belt. The fabric may be of any desired configuration such as a conventional weave consisting of warp and weft threads at any desired angle, or may consist of warp threads held together by spaced pick cords as exemplified by tire cord fabric, or of a knitted or braided configuration, or of a nonwoven configuration, or paper, or plastic film, and the like. The fabric may be friction—or skim-coated with the same or different elastomer composition as that of the elastomeric main belt body 12. More than one ply of fabric may be employed. If desired, the fabric may be cut or otherwise formed to be arranged on a bias so that the strands form an angle with the direction of travel of the belt. One embodiment of such reinforcing fabric use is shown in FIG. 2 wherein a rubber-skim coated tire cord fabric 29, is illustrated in exaggerated form. Usage of nonwoven or paper materials is described for example in U.S. Pat. No. 6,793,599 to Patterson et al., and the contents of that patent with respect to same are incorporated herein by reference. Usage of plastic film is described for example in U.S. Pat. Application Publication No. 20020187869, and the contents of that publication with respect to same are incorporated herein by reference.

Referring to FIG. 2, a standard notched V-belt 26 is illustrated. The V-belt 26 includes a main elastomeric belt body portion 12 similar to that illustrated in FIG. 1, and a tensile or load-carrying section 20 in the form of one or more tensile cords 22 embedded in an optional adhesive rubber member 18, also similar to that illustrated in FIG. 1. The main elastomeric belt body portion 12, adhesive rubber member 18 and load-carrying section 20 of the V-belt 26 may be constructed from the same materials as described above for FIG. 1.

The V-belt 26 also includes a sheave contact portion 14 as in the multi-V-ribbed belt 10 of FIG. 1. The side surfaces of the elastomeric main belt body portion 12, or in the case of a V-belt as illustrated, of the compression section, serve as the driving surfaces of the belt 26. In the embodiment illustrated, the sheave contact portion 14 is in the form of alternating notch depression surfaces or troughs 28 and toothed projections 30. These alternating depression surfaces 28 and projections 30 may preferably follow a generally sinusoidal path as illustrated which serves to distribute and minimize bending stresses as the sheave contact portion 14 passes around pulleys during operation.

While in the illustrated embodiment, the V-belt 26 is in the form of a raw-edged belt, a reinforcing fabric 29 as described above may moreover be employed, either as a face cover or overcord for the belt as shown, or fully encompassing the belt to form a banded V-belt.

Referring to FIG. 3, a toothed belt 32 is illustrated. The toothed belt 32 includes a main elastomeric belt body portion 12 and sheave contact portion 14 as in the case of the belts of FIGS. 1 and 2, and also includes a load-carrying section 20 as previously described for the belts of FIG. 1 and 2. For the synchronous belt 32 however, the sheave contact portion 14 is in the form of alternating teeth 16 and land portions 19. A reinforcing fabric 24 as furthermore described above for the belts of FIGS. 1 and 2 may also be utilized and in this case intimately fits along the alternating teeth 16 and land portions 19 of the belt 32 to form a face cover therefor.

In each of the cases of FIGS. 1-3 shown above, the main belt body portion 12 may be formed of any conventional and/or suitable cured elastomer composition, and may be of the same as or different from that described below in relation to the optional adhesive rubber member 18. Suitable elastomers that may be utilized for this purpose include for example polyurethane elastomers (including as well polyurethane/urea elastomers) (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM); ethylene vinylacetate elastomers (EVM); ethylene methylacrylate (EAM); and silicone rubber, or a combination of any two or more of the foregoing.

To form the elastomeric belt body portion 12 in accordance with an embodiment of the present invention, the elastomer(s) may be blended with conventional rubber compounding ingredients including fillers, plasticizers, stabilizers, vulcanization agents/curatives and accelerators, in amounts conventionally employed. For example, for use with ethylene-alpha-olefin elastomer and diene elastomers such as HNBR, one or more metal salts of alpha-beta organic acids may be employed in amounts now conventionally utilized to improve dynamic performance of the resultant article. Thus zinc dimethacrylate and/or zinc diacrylate may be utilized in such compositions in amounts of from about 1 to about 50 phr; or alternatively of from about 5 to about 30 phr; or of from about 10 to about 25 phr. These materials furthermore contribute to the adhesiveness of the composition, and increase the overall cross-link density of the polymer upon curing with peroxide or related agents through ionic crosslinking, as is now well known in the art.

One skilled in the relevant art would readily appreciate any number of suitable compositions for utilization in or as the elastomeric portions of the belt. A number of suitable elastomer compositions are described for example in The R. T. Vanderbilt Rubber Handbook (13$^{th}$ ed., 1996), and with respect to EPM or EPDM compositions and such compositions having particular high tensile modulus properties, are furthermore set forth in U.S. Pat. Nos. 5,610,217, and 6,616,558 respectively, the contents of which, with respect to various elastomer compositions that may be suitable for use in the formation of power transmission belt body portions, are specifically incorporated herein by reference. In addition, with respect to several cast PU compositions that may also be utilized in the practice of various embodiments of the present invention, such compositions are described for example in WO 09692584 to Wu et al., and the contents of that international patent application with respect to same are incorporated herein by reference.

In an embodiment of the present invention associated with automotive accessory drive applications, the elastomeric belt body portions 12 may be formed of a suitable ethylene alpha olefin composition, such as an EPM, EPDM, EBM or EOM composition, which may be the same or different composition as that employed as the adhesive rubber member composition.

The elastomeric main belt body portion 12 may moreover be loaded with discontinuous fibers as is well known in the art, utilizing materials such as including but not limited to cotton, polyester, fiberglass, aramid and nylon, in such forms as staple- or chopped fibers, flock or pulp, in amounts generally employed. In a preferred embodiment relating to profiled (e.g., as by cutting or grinding) multi-v-ribbed belts, such fiber loading is preferably formed and arranged such that a substantial portion of the fibers are formed and arranged to lay in a direction generally transverse the direction of travel of the belt. In molded multi-v-ribbed belts and/or synchronous belts made according to flow through methods however, the fiber loading would generally lack the same degree of orientation.

In accordance with one embodiment of the present invention, the cured composition for utilization in at least partial contact with the load carrier cord within the composite belt structure as described in several embodiments above for FIGS. 1-3 may optionally include the features and benefits thereof described in detail in aforementioned U.S. Pat. No. 6,616,558, the contents of which have been incorporated herein by reference.

Figure 4:
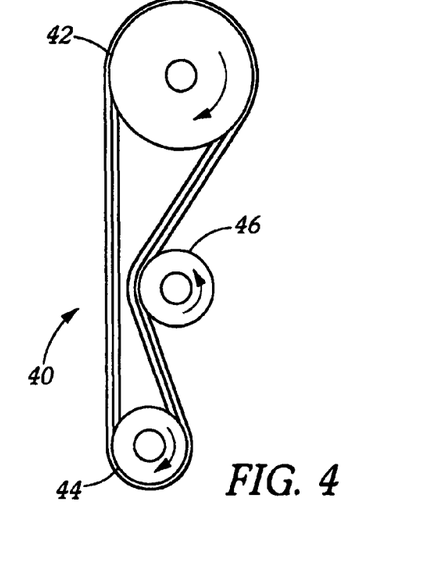
FIG. 4 is a schematic perspective view of the belt of FIG. 1 trained about two pulleys in a drive assembly according to yet another embodiment of the present invention.

In operation, the belt, as shown for example in FIGS. 1-3, is generally trained about at least one driver pulley 42 and one driven pulley 44 as shown for example schematically in FIG. 4, to form a belt drive 40, optionally in combination with an idler pulley 46 as shown.

Turning now to a description of the load carrier cord in accordance with the present invention, in general, the cord 22 of the load-carrying section 20 may be of any suitable and/or conventional material, including cotton, rayon, aramid, nylon (including nylon 4/6 and nylon 6/6), polyester, fiberglass, carbon fiber, polyimide, steel, ultrahigh-molecular-weight polyethylene, etc.; but in one embodiment it is formed of relatively high modulus organic fibers such as PEN, PBO, aramid, PK, PVA, or LCP. In accordance with an embodiment of the present invention, the load carrier cord is formed of one or more base yarns, at least one of which comprising PEN, PBO, aramid, PK, PVA, or LCP, which are arranged and formed by suitable and/or conventional techniques into a yarn which may be suitably arranged and formed into a cord as further described below, which is then helically wrapped and generally arranged to be in contact with at least a portion of or embedded in the elastomeric portion of the belt, e.g., the adhesive rubber member 18 or the main belt body 12 if adhesive member is omitted or of the same material as the main belt body; and extending longitudinally, i.e., in the direction of travel of an endless belt or similar rubber composite article.

In another embodiment, the load carrier cord of the present invention comprises at least 50% by weight fibers or yarns of PEN, PBO, aramid, PK, PVA, or LCP; and up to 50% by weight of fibers or yarns of any other suitable or conventional material. The respective yarns or fibers may be commingled, co-plied, or co-twisted at any stage of the yarn or cord manufacturing process.

By aramid is meant a long chain synthetic polyamide having its amide linkages attached directly to two aromatic rings in either the para or meta position. In the present invention, use may be made, for example, of PPD-T, poly(p-benzamide), copoly(p-phenylene/3,4'-oxydiphenylene terephthalamide), or the like. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. Commercial aramid fibers suitable for the practice of this invention include those sold under the trademarks TEIJINCONEX, TECHNORA, and TWARON by Teijin Limited, and under the trademarks NOMEX, and KEVLAR by E.I. DuPont de Nemours and Company.

A suitable commercial LCP fiber is the liquid crystal polyester-polyarylate fiber sold under the trademark VECTRAN by Celanese Acetate LLC and Kuraray Co., Ltd. PBO is sold under the trademark ZYLON by Toyobo Co., Ltd. PEN is sold under the trademark PENTEX by Honeywell International Inc. PEN is also sold by Teijin Limited, INVISTA, and Hyosung Corporation.

Polyketone fibers are formed from polymers having ketone bonds or groups in the main chain. For example, U.S. Pat. No. 5,130,408 describes a number of types or aromatic polyketones including polyetherketones (PEK), polyetheretherketones (PEEK), and polyaryletherketones (PAEK) which may be advantageously used in the present invention. One example of a commercial PEEK material has a repeat unit of oxy-1,4-phenyleneoxy-1,4-phenylene-carbonyl-1,4-phenylene which forms a linear aromatic semi-crystalline polymer with very high temperature resistance.

Another useful polyketone fiber may be formed from polyketone polymer having an intrinsic viscosity of about 5.9 dl/g in which ethylene prepared by a conventional procedure is completely copolymerized with carbon monoxide and poly (1-oxotrimethylene). In general, useful polyolefin ketone (POK) fiber can be obtained by melt spinning or wet spinning as disclosed in U.S. Pat. No. 6,763,867 and references cited therein. It may be advantageous to use a polyolefin ketone fiber having a structure represented by the following formula:

where, $1.05 >= (n+m)/n >= 1.00$, and R is an alkylene group having three or more carbons as described in U.S. Pat. No.

6,763,867. The POK fiber may advantageously be of an alternating polymer of carbon monoxide and ethylene as described in U.S. Pat. No. 6,818,728. All of the above types of polyketone fibers will be referred to as "PK" or polyketone herein and in the claims.

PVA fibers useful in the invention include those made by the wet cooled-gel spinning method and/or sold under the trademarks KURALON and/or KURALON K-II by Kuraray Co., Ltd.

Various terms are utilized in the art to describe the twist of yarns and of cords. In the present context "Base Yarn" refers to a bundle of filaments or fibers in the form as received from a base-yarn manufacturer, which may include twisted yarn or yarn with no twist. "Strand" or "yarn" or "ply" refers to a base yarn or yarns that have been folded or twisted or plied or cabled as an intermediate step in forming a cord. "Cord" refers to one or more strands, plies, or yarns that have been twisted or plied or cabled together in a final step in forming the cord. The term "twist multiplier" or "TM" will be utilized to describe the twist feature as it applies to the practice of the present invention, and is defined as the ratio of the turns per inch (TPI) to the square root of the yarn count. Yarn count is defined as the ratio of 5315 to the end denier in grams per 9000 meters. Thus, the following equation defines the twist multiplier:

$$TM = \frac{TPI}{\sqrt{5315/denier}}.$$

It has been found that prior art attempts to improve flex fatigue resistance of higher modulus cords, comprising for example PEN, PBO, aramid, PK, PVA, or LCP, by optimizing the twist/ply level and braiding according to known methods and rules of thumb have resulted in decreasing cord strength and/or modulus. For example braiding generally decreases the cord strength, but not modulus whereas applying a high conventional twist will decrease both strength and modulus. On the other hand, optimizing the cord by known methods to achieve satisfactory strength and modulus has resulted in decreased flex fatigue resistance. In particular, in the conventional balanced-twist approach, a first TM is applied to the base yarn or yarns to form a strand or strands. Then the strand or strands are plied with a second twist multiplier of equal magnitude and opposite direction of the first twist multiplier to form a cord. The fatigue resistance of such conventionally twisted cords is not as high as desired for higher modulus materials such as PEN, PBO, aramid, PK, PVA, or LCP.

The present invention overcomes these problems by constructing a cord with an unbalanced twist wherein the first twist is greater than the second twist. One embodiment of the present invention identifies a ratio of first TM to second TM, and opposite twist directions for each twist stage. More particularly, at least one or more of the base yarns may be first twisted together in a first stage corresponding to a first TM in the range of from about 2 to about 9, or of from about 3 to about 6, or of from about 4.5 to about 5.5; and then one or more of the thus twisted strands may be twisted together in a second stage corresponding to a second TM in the range of from about 0.5 to about 6, or of from about 1 to about 5; or of from about 1.5 to about 3.5; but wherein the ratio of the first TM to the second TM is greater than about 1.5, or in the range of from about 1.5 to about 4, or of from about 2 to about 3.

In accordance with a second embodiment, the present invention identifies a difference between a first TM and a second TM, and opposite twist directions for each twist stage. More particularly, one or more of the raw yarns may be first twisted together in a first stage corresponding to a first TM in the range of from about 2 to about 9, or of from about 3 to about 6, or of from about 4.5 to about 5.5; and then one or more of the thus twisted strands may be twisted together in a second stage corresponding to a second TM in the range of from about 0.5 to about 6, or of from about 1 to about 2.5; or of from about 1.5 to about 2.25; but wherein the difference between the first TM and the second TM is greater than about 0.5, or in the range of from about 0.5 to about 4, or of from about 1 to about 3.

To describe first and second TM's in the construction of cords, the following convention will be followed herein: "2×6"=a first TM of 2 and a second TM of 6. To describe the number of base yarns and strands used in the construction of cords, the following convention will be followed herein: "y–n/m"=an integer number "n" of a base yarn of "y" denier per end forms each of the "m" strands of the cord. Thus the total strand size (in denier) after the first twist step is the product y times n. The total cord size (in denier) after the second twist step is the product y times n times m.

The base yarn size is not limited in the practice of the invention, but is only limited by the availability of base yarns from the manufacturers. The final cord size is not particularly limited in the practice of the invention, but may be controlled as desired for a particular application by suitable choice of "n" and "m", as is known in the art. There is often, however, a practical upper limit on choice of "n" and "m" due to increased equipment and handling costs for exceedingly many ends. Thus, "n" may be in the range of from 1 to about 10, and "m" may be in the range of from 1 to about 12. In one embodiment of the invention, base yarns of from about 400 denier to about 3000 denier may be used. Thus, strand size after the first twist step may be in the range of from about 400 to about 30,000 denier, and cord size after the second twist step may be in the range of from about 400 to about 360,000 denier.

Figure 7:
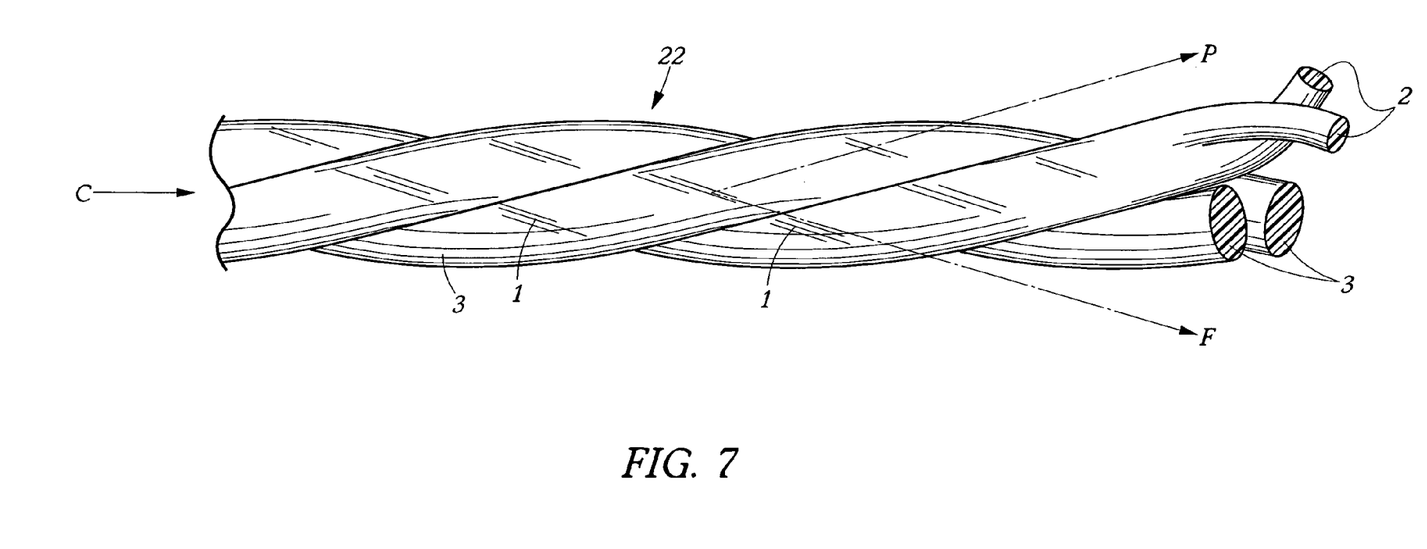
FIG. 7 is schematic side elevation view, with parts in section and unraveled, of a portion of a load carrier cord constructed in accordance with an embodiment of the present invention.

Referring to FIG. 7, a schematic side elevation of a portion of a load carrier cord 22 for reinforcing a rubber composite article according to an embodiment of the invention is shown. For purposes of illustration, two base yarns 2, comprising a plurality of filaments 1, are twisted in a first direction resulting in a filament alignment direction F and a strand 3. Any desired number of base yarns could be used. For purposes of illustration, three strands 3 are twisted together in a second direction opposite the first direction, resulting in the strand or ply direction P. Any desired number of plies may be used. Because an unbalanced twist is used, wherein the first twist is greater than the second twist, neither the ply direction P nor the filament direction F are parallel to the cord direction C, and they diverge in opposition directions from the cord direction C.

The methods and machinery used for twisting and plying the strands and the cord are not particularly limited. Suitable textile twisting machines include for example a ring twister, a 2-for-1 twister, a direct cabler, and any other twister known in the art.

The load carrier cords in accordance with an embodiment of the invention may be treated with one or more adhesive compositions utilizing any suitable and/or conventional materials and application processes, in order to establish or improve their adhesion to the surrounding elastomer constituents of the article as is well known in the art. For example the cord may be treated with an adhesive, or adhesives, to bond the filaments to each other and to promote the adhesion of the cord to the elastomeric portion of the belt. In accordance with one embodiment, the cord could be first treated with a primer, which could be either aqueous-based or solvent-based, such as polyisocyanates and epoxy compounds. The treated cord could be then treated with another conventional and/or otherwise suitable adhesive such as resorcinol formaldehyde latex (RFL). After each treatment, the cord is generally passed through an oven or a series of ovens at temperatures from 100° C. to 290° C. to dry and cure the adhesives. Optionally the cord could be then treated with an additional overcoat adhesive, e.g., a mixture of high emulsions, pigments and curatives in a water-based medium, or a mixture of pigments and curatives with dissolved polymers in a solvent solution such as those available under the trademark CHEMLOK by Lord Corporation, or other suitable rubber cements, for additional adhesion improvement.

Alternatively, e.g., when the surrounding elastomer constituents are of a castable PU elastomer, such treatment may be limited to application of a primer, or may be further modified or eliminated altogether. Any suitable cord treatment process may be utilized however, and as an example U.S. Pat. No. 5,807,194 discloses a method for treating cords for utilization in cast-PU-based endless belts, and the relevant contents thereof are hereby incorporated herein by reference.

Any suitable and/or conventional method may be utilized to form the belts in accordance with various embodiments of the present invention. For example, where non-castable belt elastomers are utilized, i.e., millable rubbers, either with or without fiber loading, the belt building steps may include those of positioning an optional fabric cover element as described above within an appropriately configured mold cavity having grooved portions for the formation of teeth or ribs or notches, or upon a suitably configured belt-building drum or mandrel; disposing the load carrier cord against the second surface of the fabric cover element, such as by helically winding one or more tensile cords about the fabric; disposing elastomeric material against the tensile member; disposing additional alternating arrangements of tensile members and/or elastomeric material against this tensile member as required of a given construction; applying sufficient temperature and pressure to cure or vulcanize the elastomer materials; and removing the assembly from the mold cavity or mandrel.

Where castable belt body portions are utilized, e.g., in toothed PU belt manufacture, the production steps may furthermore include optionally wrapping a wear-resistant fabric about the surface of a grooved mold portion in a manner such that the first surface of the fabric cover element is adjacent the grooved mold portion; applying the load carrier cord about the wear-resistant fabric such as by helically winding one or more tensile cords about the fabric; introducing a substantially liquid elastomeric material into the mold cavity; and polymerizing the thus formed product. The tooth portions of such belts may moreover have any suitable shape, including curvilinear, trapezoidal, etc.

It has been found that load carrying cords constructed in accordance with various embodiments of the present invention as described herein when utilized in the construction of multi-v-ribbed endless belts have resulted in such belts exhibiting significantly improved flex fatigue resistance properties than similar belts incorporating conventional load carrying cords, while substantially maintaining load carrying capability level.

EXAMPLES

To illustrate various benefits of the present invention, a number of endless multi-v-ribbed belts were constructed which were substantially identical to one another with the exception of the particular set of twist multipliers corresponding to the first and second stage twists used in constructing their load carrying cords. In each case, the belts included three ribs; the undercord was in each instance a conventional EPDM-based composition as generally described in aforementioned U.S. Pat. No. 5,610,217; and the adhesion gum in which the load carrier cord was embedded was similarly a conventional EPDM-based composition as generally described in aforementioned U.S. Pat No. 6,616,558. The example and comparative belts in Table 2 comprise higher-modulus adhesion gum and undercord recipes than the belts of Table 1.

Each belt moreover included a conventional fabric backing. For the belts constructed in accordance with an embodiment of the present invention and also the comparative belts of the prior art, the load carrier cord was in each instance 4000 denier para-aramid, identified as 1000-¼, wherein the 1000 denier base yarns were first twisted individually in the Z direction at a first TM, and four of the thus-twisted strands were then plied and twisted in the opposite direction at a second TM. The base yarns were, either KEVLAR (K-119) sold under that trademark by DuPont (Comparative A-C and Example 1), or Twaron (T2100) sold under that trademark by Teijin (Comparative D and Example 2). The relationship of the first TM to the second TM for the belt examples and comparative examples is in each case provided in Tables 1 and 2 below.

In Table 1 the yarns and cords formed therefrom employed a conventional three-dip adhesive system as described above, comprising a first application to the yarns of an isocyanate-based primer, followed by the application to the yarns of a conventional RFL compatible with the surrounding belt materials, and thereafter application to the twisted cord of an adhesive composition available from Lord Corporation under the trademark CHEMLOK. For the belts in Table 2, an epoxy-based primer was substituted for the isocyanate-based primer.

The belts were built inverted on smooth mandrels according to conventional methods of building, vulcanizing, cutting, profiling, and inverting.

For each belt, "Tensile Strength" as shown in Tables 1 and 2 below was determined in accordance with ASTM D885, reporting the whole belt breaking strength of a new belt in pounds force; "Durability" was determined utilizing the test configuration represented in FIG. 5 and further described below; and belt "Flexural Fatigue Resistance" was determined utilizing the test configuration represented in FIG. 6 and further described below.

Figure 5:
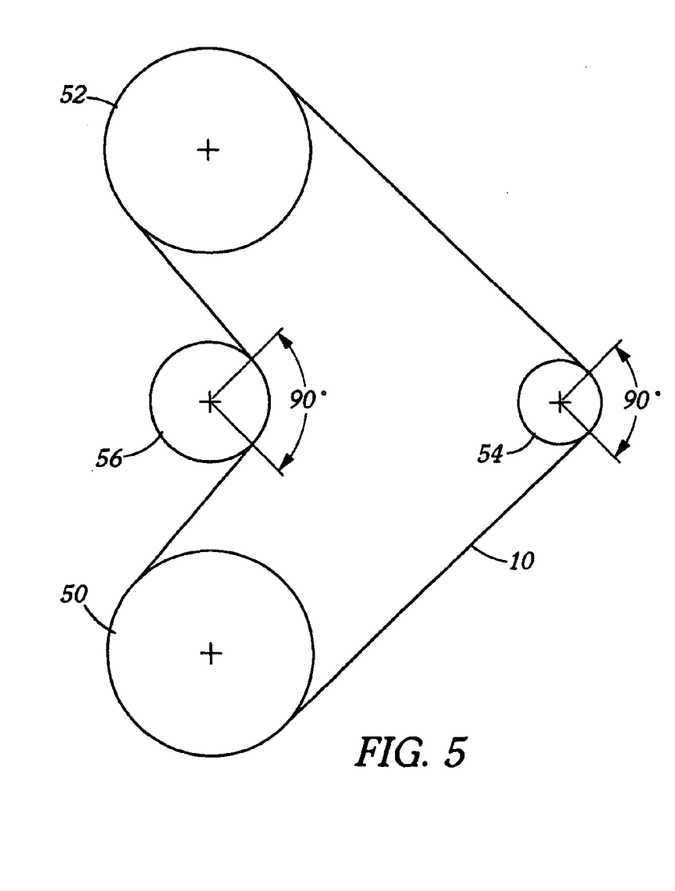
FIG. 5 is a schematic representation of a durability test configuration utilized in describing an embodiment of the present invention.

For the durability analysis, a 1200 mm long belt was trained around two multi-grooved major pulleys 50, 52, a multi-grooved inside tensioning idler 54 and a backside idler 56 as shown schematically in FIG. 5. The two major pulleys measured 120.7 mm in diameter, the backside idler measured 76.2 mm in diameter and the tensioning idler measured 44.5 mm in diameter. The belt was operated with pulley 50 driven at 4900 rpm at 100° C., 12.7 kW of power, with 24.7 Nm of torque at a constant horizontal tension of 77.1 kg to a point of failure, as evidenced by tensile cord break or rubber chunk out. The average belt life in hours for two tests of each type of belt is reported as "Durability."

Figure 6:
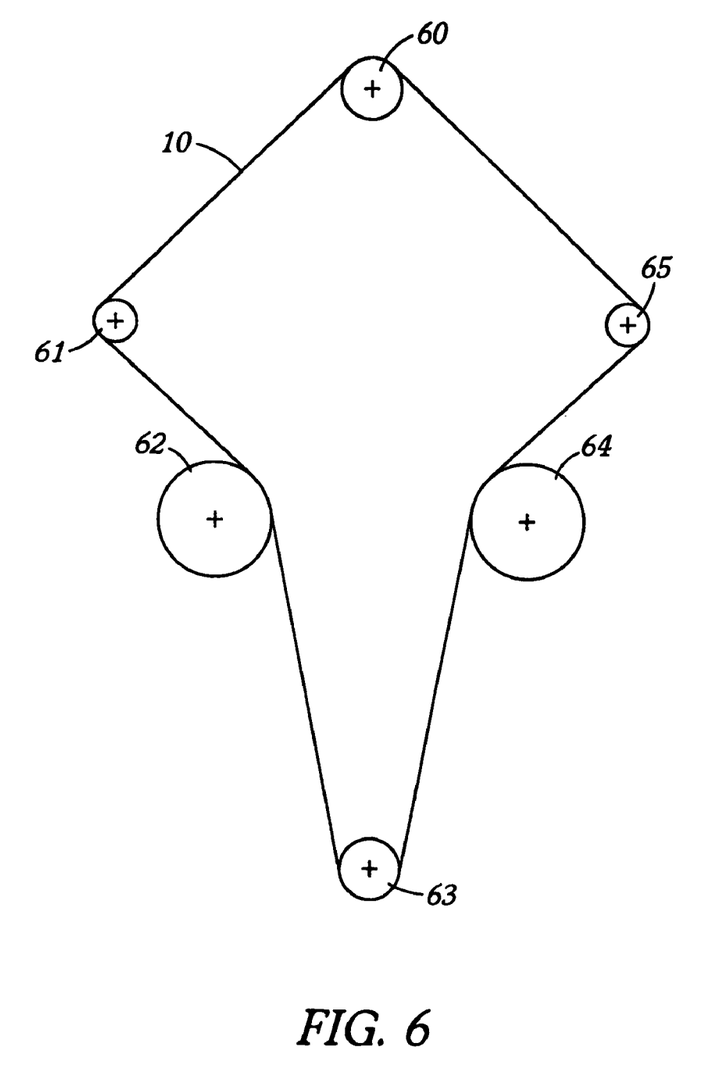
FIG. 6 is a schematic representation of a flexural fatigue resistance test configuration utilized in describing an embodiment of the present invention.

For the flexural fatigue resistance analysis, a 1200 mm long belt was trained around two multi-grooved pulleys 60, 63, and four flat idlers 61, 62, 64 and 65 as shown schematically in FIG. 6. The multi-grooved pulleys measured 38 mm in diameter, flat idlers 62 and 64 measured 50.8 mm in diameter, and flat idlers 61 and 65 measured 17.5 mm in diameter. The belt was operated with pulley 60 driven at 8200 rpm, at ambient temperature, with a vertical tension of 45.4 kg applied at 63, for 22 hours, at which time the belt was removed for tensile strength testing. The average percent retention of tensile strength for 5 or 6 tests of each type of belt is reported as "Flexural Fatigue Resistance."

TABLE 1

| Example | Cord Material | Twist Multiplier Relationship | Tensile Strength (lbf) | Flexural Fatigue Resistance (%) | Durability (hrs.) |
|---|---|---|---|---|---|
| Comparative A | K-119 | 2 × 6 | 2804 | 79 | 170 |
| Comparative B | K-119 | 2 × 5 | 3260 | 80 | 295 |
| Comparative C | K-119 | 4 × 4 | 3123 | 83 | 157 |
| Example 1 | K-119 | 5 × 2 | 2775 | 91 | 282 |

The results in Table 1 show that the example 1 cord with 5×2 TM cord construction is better overall than comparative B with 2×5 cord, which is in turn better than comparative C with 4×4 cord. This was surprising since those skilled in the art generally try to achieve a balanced twist such as exemplified by the comparative C 4×4 construction. The durability of the 5×2 construction, at 282 hours, is much greater than that of the 4×4, at 157 hrs, but about the same as the 2×5, at 295 hours. The superiority of the 5×2 construction according to the present invention over both the comparative 4×4 and 2×5 constructions is particularly evident in the flexural fatigue resistance results, wherein the 5×2 construction had 91% strength retention, significantly higher than any of the comparative examples.

In a second round of comparative testing, the two best constructions from Table 1, comprising the 5×2 cord and the 2×5 cord, were rebuilt and retested, and the results are reported in Table 2. The differences in adhesive treatment and belt construction materials noted above were applied, so that again, the two constructions to be compared were identical except for the cord twist. Again the embodiment of the invention contained in example 2 provides improved overall performance over comparative D. The durability is again comparable for both example 2 and comparative D, but the flexural fatigue resistance is again significantly greater for the inventive 5×2 construction of example 2. Thus, the present invention provides a high modulus cord with an unbalanced twist construction at 5×2 having a greatly improved balance of durability and flexural fatigue resistance.

TABLE 2

| Example | Cord Material | Twist Multiplier Relationship | Tensile Strength (lbf) | Flexural Fatigue Resistance (%) | Durability (hrs.) |
|---|---|---|---|---|---|
| Example 2 | T-2100 | 5 × 2 | 3470 | 94 | 278 |
| Comparative D | T-2100 | 2 × 5 | 4608 | 60 | 249 |

While the illustrations provided above describe specifically multi-V-ribbed belts having EPDM belt body portions, one of ordinary skill in the relevant art would readily appreciate that the present invention is not so limited; and that benefits of the present invention could be derived in any application requiring both a high degree of durability (i.e., retention of load carrying capability) and flexibility, e.g., such as belts used in multi-function automotive applications such as generator starter assemblies and accessory drive applications; automotive-and industrial timing belts formed of HNBR or PU, tires, flexible couplings, airsprings, etc. Thus by constructing the load carrier cord of a power transmission belt with an unbalanced twist wherein the first twist multiplier is greater than the second twist multiplier, the present invention in one embodiment provides a method of increasing both the flexural fatigue resistance and the durability of a power transmission belt, compared to belts constructed in accordance with prior art techniques. Although the present invention has been described in detail for the purpose of illustration, it is to be understood that such detail is solely for that purpose and that variations can be made therein by one skilled in the art without departing from the spirit or scope of the present invention except as it may be limited by the claims. The invention disclosed herein may suitably be practiced in the absence of any element that is not specifically disclosed herein.

What is claimed is:

1. In an endless belt comprising an elastomeric belt body and a load carrier cord embedded in said body; said cord comprising a plurality of yarns having a first twist corresponding to a first twist multiplier and a first twist direction, and said cord having a second twist corresponding to a second twist multiplier in a direction opposite said first twist direction; the improvement characterized in that the ratio of said first twist multiplier to said second twist multiplier is greater than 1.5; and said first twist multiplier is greater than about 4.5.

2. The belt of claim 1 wherein said yarns comprise a plurality of fibers, wherein at least half of said fibers comprise polyketone or polyvinylalcohol.

3. The belt of claim 2 selected from a multi-v-ribbed belt, a v-belt, a toothed synchronous belt, and a flat belt; and wherein said elastomeric belt body comprises cast polyurethane.

4. The belt of claim 3 wherein said first twist multiplier is in the range of from about 4.5 to about 9.

5. The belt of claim 3 wherein said first twist multiplier is in the range of from about 4.5 to about 6.

6. The belt of claim 3 wherein said second twist multiplier is in the range of from about 0.5 to about 6.

7. The belt of claim 3 wherein said second twist multiplier is greater than 1.0 and less than 3.5.

8. A belt drive comprising the belt of claim 3 trained about, at least, one driver pulley and one driven pulley.

9. The belt of claim 2 in the form of a multi-v-ribbed belt.

10. The belt of claim 9 wherein said cord has adhesive treatment for bonding said fibers together and said cord to said body.

11. The belt of claim 10 wherein said elastomeric belt body comprises an elastomer selected from the group EPDM, HNBR, EPM, EOM, EBM, EBDM, EODM, NBR, PU, CR, NR, SBR, BR, EAM, EVM, silicone, and blends thereof.

12. The belt of claim 11 wherein said first twist multiplier is in the range of from about 4.5 to about 9.

13. The belt of claim 11 wherein said first twist multiplier is in the range of from about 4.5 to about 6.

14. The belt of claim 11 wherein said second twist multiplier is in the range of from about 0.5 to about 6.

15. The belt of claim 11 wherein said second twist multiplier is greater than 1.0 and less than 3.5.

16. A belt drive comprising the belt of claim 11 trained about, at least, one driver pulley and one driven pulley.

17. The belt of claim 1 wherein the ratio of said first twist multiplier to said second twist multiplier is in the range of from 1.5:1 to about 4:1.

18. The belt of claim 17 wherein said second twist multiplier is greater than 1.0 and less than 3.5.

19. A belt drive comprising the belt of claim 18 trained about at least one driver pulley and one driven pulley.

20. The belt of claim 1 wherein said ratio is greater than about 2.

21. The belt of claim 1 wherein said second twist multiplier is greater than about 0.5.

22. The belt of claim 21 wherein said second twist multiplier is less than 3.5.

23. The belt of claim 21 wherein said second twist multiplier is between 1.0 and 3.5.

24. The belt of claim 23 wherein said ratio is greater than about 2.

25. The belt of claim 21 wherein said second twist multiplier is between 1.5 and 3.5.

26. In an endless belt comprising an elastomeric belt body and a load carrier cord embedded in said body; said cord comprising a plurality of yarns having a first twist corresponding to a first twist multiplier and a first twist direction, and said cord having a second twist corresponding to a second twist multiplier in a direction opposite said first twist direction; the improvement characterized in that the ratio of said first twist multiplier to said second twist multiplier is greater than 1.5; said first twist multiplier is greater than about 4.5, and at least one said yarn comprises fibers of polyketone.

27. The belt of claim 26 wherein said second twist multiplier is greater than 1.0 and less than 3.5.

* * * * *